United States Patent
Roesele et al.

(10) Patent No.: US 10,570,752 B2
(45) Date of Patent: Feb. 25, 2020

(54) IMPULSE ELEMENT MODULE FOR A TURBOMACHINE

(71) Applicant: MTU Aero Engines AG, Dachau (DE)

(72) Inventors: Gerhard-Heinz Roesele, Aichach (DE); Markus Schlemmer, Mainburg/Sandelzhausen (DE); Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 306 days.

(21) Appl. No.: 15/587,724

(22) Filed: May 5, 2017

(65) Prior Publication Data
US 2017/0321557 A1 Nov. 9, 2017

(30) Foreign Application Priority Data
May 9, 2016 (DE) .......... 10 2016 207 874

(51) Int. Cl.
*F01D 5/26* (2006.01)
*F01D 5/16* (2006.01)
(Continued)

(52) U.S. Cl.
CPC .......... *F01D 5/26* (2013.01); *F01D 5/16* (2013.01); *F04D 29/668* (2013.01); *F16F 7/10* (2013.01);
(Continued)

(58) Field of Classification Search
CPC ... F01D 5/26; F01D 5/16; F01D 9/041; F01D 25/06; F16F 7/10; F16F 15/10; F16F 7/01;
(Continued)

(56) References Cited

U.S. PATENT DOCUMENTS 1,833,751 A * 11/1931 Kimball .......... F01D 5/16
416/222
1,833,754 A * 11/1931 Paget .......... F01D 5/16
416/215
(Continued)

FOREIGN PATENT DOCUMENTS

CN 202493618 U * 10/2012
DE 102014223231 6/2016
(Continued)

OTHER PUBLICATIONS

NPL_"Multiparticle_Impact_Damping_Design_Methodology_For_Extreme_Environments"; published May 2003; Author Bryce L. Fowler; retreived from the internet May 20, 2019; See pp. 74-85. (Year: 2003).*

(Continued)

*Primary Examiner* — Sizo B Vilakazi
*Assistant Examiner* — Brian R Kirby
(74) *Attorney, Agent, or Firm* — Davidson, Davidson & Kappel, LLC (57) ABSTRACT

An impulse element module for a turbomachine, in particular a turbine stage of a gas turbine, preferably an aircraft gas turbine, including a single-unit receptacle component having a base and side walls that extend peripherally thereon, the side walls and the base bounding a receiving space; a single-unit insert component having a form that is inserted into receiving space of receptacle component; together, the receptacle component and the insert component accommodated therein being designed to define a plurality of spaced apart cavities; and an impulse element, in particular a sphere, being accommodated in each cavity; and a single-unit sealing component that is joined in a material-to-material bond to the receptacle component in a way that allows the receiving space to be sealed and the insert (Continued)

component to be surrounded by the receptacle component and the sealing component.

26 Claims, 5 Drawing Sheets

(51) Int. Cl.
    *F16F 15/10*     (2006.01)
    *F04D 29/66*     (2006.01)
    *F16F 7/10*     (2006.01)

(52) U.S. Cl.
    CPC .......... *F16F 15/10* (2013.01); *F05D 2230/22* (2013.01); *F05D 2250/241* (2013.01); *F05D 2260/96* (2013.01)

(58) Field of Classification Search
    CPC ............... F04D 29/668; F05D 2260/96; F05D 2230/22; F05D 2250/241; F05D 2240/124; F05D 2240/123; F05D 2300/171; F05D 2300/121; F05D 2240/12; F05D 2230/60
    USPC ............. 415/119; 416/145, 500, 190, 193 A; 206/526, 725, 315.9, 315.91
    See application file for complete search history.

(56) References Cited

U.S. PATENT DOCUMENTS

| | | | | |
|---|---|---|---|---|
| 2,349,187 | A * | 5/1944 | Meyer | F01D 5/16 416/190 |
| 2,462,961 | A * | 3/1949 | Harker | B64C 11/008 416/229 R |
| 2,651,494 | A * | 9/1953 | Persson | F01D 5/3053 416/220 R |
| 2,862,686 | A * | 12/1958 | Bartlett | F01D 5/16 416/233 |
| 2,877,980 | A * | 3/1959 | Stalker | F01D 5/26 416/190 |
| 2,997,274 | A * | 8/1961 | Hanson | F01D 5/26 416/140 |
| 2,999,669 | A | 9/1961 | McGinnis et al. | |
| 4,441,859 | A * | 4/1984 | Sadler | F01D 5/16 416/145 |
| 4,460,314 | A * | 7/1984 | Fuller | F01D 5/26 416/145 |
| 4,917,574 | A * | 4/1990 | Dodd | F01D 5/16 416/190 |
| 5,219,144 | A * | 6/1993 | Fox | F16F 7/10 248/562 |
| 5,232,344 | A * | 8/1993 | El-Aini | F01D 5/16 416/145 |
| 5,344,024 | A * | 9/1994 | Cohu | A45C 5/03 206/526 |
| 5,369,882 | A * | 12/1994 | Dietz | F01D 5/22 29/889.1 |
| 5,820,348 | A * | 10/1998 | Fricke | F01D 5/027 416/248 |
| 6,125,977 | A * | 10/2000 | Nekomoto | E04B 1/985 188/378 |
| 6,155,789 | A * | 12/2000 | Mannava | C21D 10/005 29/889.1 |
| 6,439,359 | B1 * | 8/2002 | Kato | B60G 13/16 188/379 |
| 6,494,679 | B1 * | 12/2002 | Gadre | F01D 5/24 416/145 |
| 6,547,049 | B1 * | 4/2003 | Tomlinson | F01D 25/04 188/379 |
| 6,554,112 | B2 * | 4/2003 | Kato | F16F 7/10 188/378 |
| 6,626,642 | B1 * | 9/2003 | Veldkamp | F16F 7/10 416/79 |
| 6,676,380 | B2 * | 1/2004 | Davis | F01D 5/26 416/229 A |
| 6,719,108 | B2 * | 4/2004 | Hasegawa | B60G 7/001 188/268 |
| 6,827,551 | B1 * | 12/2004 | Duffy | F01D 5/16 415/119 |
| 6,991,077 | B2 * | 1/2006 | Maeno | F16F 7/108 188/378 |
| 7,232,017 | B2 * | 6/2007 | Minor | F16F 7/015 174/42 |
| 7,837,439 | B2 * | 11/2010 | Bech | F03D 1/0675 416/500 |
| 8,157,507 | B1 * | 4/2012 | Coffin | F01D 5/26 415/119 |
| 8,926,282 | B2 * | 1/2015 | Miller | F01D 5/26 188/379 |
| 8,978,250 | B2 * | 3/2015 | Barcock | B22F 3/1055 29/419.1 |
| 9,121,466 | B2 * | 9/2015 | Tsugihashi | F16F 15/363 |
| 9,334,740 | B2 * | 5/2016 | Kellerer | F01D 5/16 |
| 9,371,733 | B2 | 6/2016 | Hartung | |
| 10,247,005 | B2 * | 4/2019 | Hartung | F16F 15/32 |
| 10,260,372 | B2 * | 4/2019 | Klinetob | F01D 9/041 |
| 2002/0030315 | A1 * | 3/2002 | Kato | F16F 7/10 267/141 |
| 2002/0139625 | A1 * | 10/2002 | Kato | F16F 7/10 188/378 |
| 2005/0132945 | A1 * | 6/2005 | Yamada | B63B 35/731 114/55.5 |
| 2010/0320046 | A1 * | 12/2010 | Provost | F16F 7/015 188/380 |
| 2011/0264413 | A1 * | 10/2011 | Stankowski | B23P 6/005 703/1 |
| 2012/0024646 | A1 * | 2/2012 | Tsugihashi | F16F 7/015 188/268 |
| 2013/0280083 | A1 * | 10/2013 | Hartung | F01D 5/16 416/223 R |
| 2014/0348639 | A1 * | 11/2014 | Stiehler | F01D 5/18 415/119 |
| 2014/0348657 | A1 * | 11/2014 | Stiehler | F01D 5/10 416/190 |
| 2015/0052898 | A1 * | 2/2015 | Erno | B22F 5/04 60/726 |
| 2015/0233264 | A1 * | 8/2015 | Hyatt | F01D 25/04 415/119 |
| 2015/0361801 | A1 * | 12/2015 | Blaney | F01D 5/16 416/232 |
| 2016/0024928 | A1 * | 1/2016 | Hartung | F01D 5/06 415/209.1 |
| 2016/0123303 | A1 * | 5/2016 | Ollgaard | F16F 7/10 52/173.1 |
| 2016/0138401 | A1 | 5/2016 | Hartung et al. | |
| 2016/0146041 | A1 * | 5/2016 | Hartung | F01D 5/10 415/119 |
| 2016/0333710 | A1 * | 11/2016 | Klinetob | F01D 25/06 |
| 2017/0044910 | A1 * | 2/2017 | Hartung | F01D 5/16 |
| 2017/0067487 | A1 * | 3/2017 | Hartung | F01D 5/16 |
| 2017/0159465 | A1 * | 6/2017 | Schlemmer | F01D 9/041 |
| 2017/0266745 | A1 * | 9/2017 | Richter | B23K 1/0018 |

FOREIGN PATENT DOCUMENTS

| | | | |
|---|---|---|---|
| WO | WO 2012/095067 A1 | 7/2012 | |
| WO | WO2012095067 A1 * | 7/2012 | ............... F01D 5/16 |

OTHER PUBLICATIONS

NPL_MultiparticleDampingMPIDDesignMethodology_Pub_05_2003; Published May 2003; Author Bryce L. Fowler; retreived from the internet Oct. 10, 2019; URL: https://apps.dtic.mil/dtic/tr/fulltext/u2/a420177.pdf (Year: 2003).*

* cited by examiner

IMPULSE ELEMENT MODULE FOR A TURBOMACHINE

This claims the benefit of German Patent Application DE 10 2016 207 874.7, filed May 9, 2016 and hereby incorporated by reference herein.

The present invention relates to an impulse element module of a turbomachine, in particular for a turbine stage of a gas turbine, preferably an aircraft gas turbine.

BACKGROUND

Due to the elasticity thereof, and excitation of the same by the working fluid, respectively gas circumflowing the same, blade assemblies, in particular rotor blade assemblies of gas turbines, tend to vibrate. Natural frequencies of the blades may be thereby excited, it being possible for thereby occurring resonances to lead to damage to the gas turbine, in particular to the blade assembly.

In comparison with heretofore conventional dissipative frictional dampers, especially for what is generally referred to as detuning vibrations, WO 2012/095067 A1 describes a design where the impulse elements in a rotor blade influence the vibrations induced by impact contacts, particularly when the frequency nearly reaches the natural frequency.

SUMMARY OF THE INVENTION

The assignee of the present invention has also developed designs for housings which accommodate a plurality of impulse elements, and for securing the housing, together with the impulse elements, in a corresponding installation space of a rotor blade assembly.

It is an object of the present invention to provide an impulse element module having impulse elements accommodated therein that is readily manufacturable and has a simple structure.

The present invention provides an impulse element module including a receptacle component featuring a single-unit design, that has a base and side walls extending peripherally thereon; the side walls and the base bounding a receiving space, and has an insert component featuring a single-unit design that is inserted into the receiving space of the receptacle component; together, the receptacle component and the insert component accommodated therein being designed to define a plurality of spaced apart cavities; and an impulse element, in particular a sphere, being accommodated in each cavity, and a sealing component, that is formed as a single unit, being joined in a material-to-material bond to the receptacle component in a way that allows the receiving space to be sealed, and the insert component to be surrounded by the receptacle component and the sealing component. The concept of a "single-unit sealing component" is intended to also include the case where the sealing component is built up additively on the insert component and/or the receptacle component and thus is already joined thereto in a material-to-material bond upon the formation thereof.

The design presented here of an impulse element module makes it possible to manufacture two single-unit components at a time, that are joined to one another or are placed one inside of the other, thereby forming a plurality of cavities containing impulse elements. Joining the sealing component to the receptacle component in a material-to-material bond forms a closed box which securely accommodates the insert component and the impulse element. Since the sealing component is joined in a material-to-material bond to the receptacle component, one may also speak of a single-unit box that accommodates the insert component and the impulse element. An impulse element module having such a design may be variably inserted into a corresponding depression on a blade assembly of a compressor stage or a turbine stage of a gas turbine. Such a depression thereby preferably has an inner contour whose form essentially complements the outer contour of the impulse element module.

The insert component may have a terminating wall which, in the inserted state of the insert component in the receptacle component, seals the receiving space. By the outer side thereof facing away from the receiving space, the terminating wall may thereby essentially end flush with at least one front face of the surrounding side walls of the receptacle component. Thus, the terminating wall, in particular the outer side thereof and the front face(s) of the side walls essentially form a common, continuous plane. The sealing element may be configured on the front face(s) of the side walls and the outer side of the terminating walls.

At the inner side thereof facing the receiving space, the terminating wall may have a plurality of webs, in particular longitudinal webs and transverse webs, that project from the inner side. In the inserted state, these webs form separating walls in order to bound the plurality of cavities.

The base and the side walls of the receptacle component may essentially have a flat form on the inner surfaces thereof facing the receiving space.

In addition, the insert component may have a plurality of longitudinal webs and transverse webs that form a grid-like structure, the longitudinal webs and the transverse webs, together with at least one of the inner surfaces of the base or of the side walls, bounding the plurality of cavities, at least in portions thereof.

Alternatively, on the inner surface thereof facing the receiving space, the base may have a plurality of webs, in particular longitudinal webs and transverse webs that project into the receiving space in a way that allows the webs and the inner surface of the base to form a partial volume of the plurality of cavities.

The webs of the insert component and the webs of the receptacle component may be configured in a way that allows front faces of the webs of the insert component and front faces of the webs of the receptacle component to rest against each other in the inserted state of the insert component, in a way that allows the plurality of cavities to be bounded by the webs of the insert component, the webs of the receptacle component, the inner surface of the base, and the inner side of the terminating wall.

In addition, the sealing component may be joined in a material-to-material bond to the terminating wall of the insert component.

In the case of such an impulse element module, the receptacle component, the insert component and the sealing component may be additively manufactured, in particular by a selective laser melting process.

Alternatively or additionally, it may also be borne in mind that the receptacle component and/or the insert component and/or the sealing component are/is at least partially manufactured in a machining process, such as electrochemical machining, or in a powder metal injection molding process. A machining process may also be optionally used in addition to or subsequently to an additive process, for instance, to smooth the outer contour of the impulse element module.

Another aspect of the present invention also relates to a method for manufacturing an impulse element module for a turbomachine, in particular for a turbine stage of a gas turbine, including the steps of:

manufacturing a receptacle component by building up the same layer by layer using an additive manufacturing process, in particular a selective laser melting process, the receptacle component having a base and side walls extending peripherally thereon; the side walls being built up starting from the base in a way that allows a receiving space to be formed within the side walls;

manufacturing an insert component that is grid-like at least in portions thereof by building up the same layer by layer using an additive manufacturing process, in particular a selective laser melting process;

inserting the insert component into the receiving space of the receptacle component; prior to or during the insertion, impulse elements, in particular spheres, being inserted into cavities that are jointly formed by the receptacle component and the insert component;

using an additive manufacturing process, in particular a selective laser melting process, to build up a sealing component layer by layer on the receptacle component having the insert component inserted therein, to mutually join the receptacle component and the sealing component in a material-to-material bond and form a single-unit enclosure for the insert component and the impulse elements contained therein.

The present invention also relates to a rotor blade assembly of a compressor stage or of a turbine stage of a gas turbine, the rotor blade assembly having a depression into which an above described impulse element module is inserted, the depression preferably being provided in a rotor blade root region. A rotor blade assembly is thereby understood to be a single rotor blade or a rotor blade segment having a plurality of rotor blades.

Finally, the present invention also relates to a gas turbine, in particular an aircraft gas turbine having a plurality of compressor stages and a plurality of turbine stages, it featuring at least one above described impulse element module that is associated with a compressor stage or a turbine stage. A plurality of impulse element modules may thereby be associated with a rotor component, in particular a rotor blade ring, a compressor stage or a turbine stage, a single impulse element module preferably being associated with a single rotor blade assembly of the rotor blade ring.

The present invention will be explained exemplarily in the following with reference to the enclosed figures and without being limited thereto.

BRIEF DESCRIPTION OF THE DRAWINGS

Directional indications, such as "axial," "axially," "radial," "radially," and "circumferential" are basically to be understood relative to the machine axis of the gas turbine, unless explicitly or implicitly indicated otherwise from the context.

DETAILED DESCRIPTION

Figure 1:
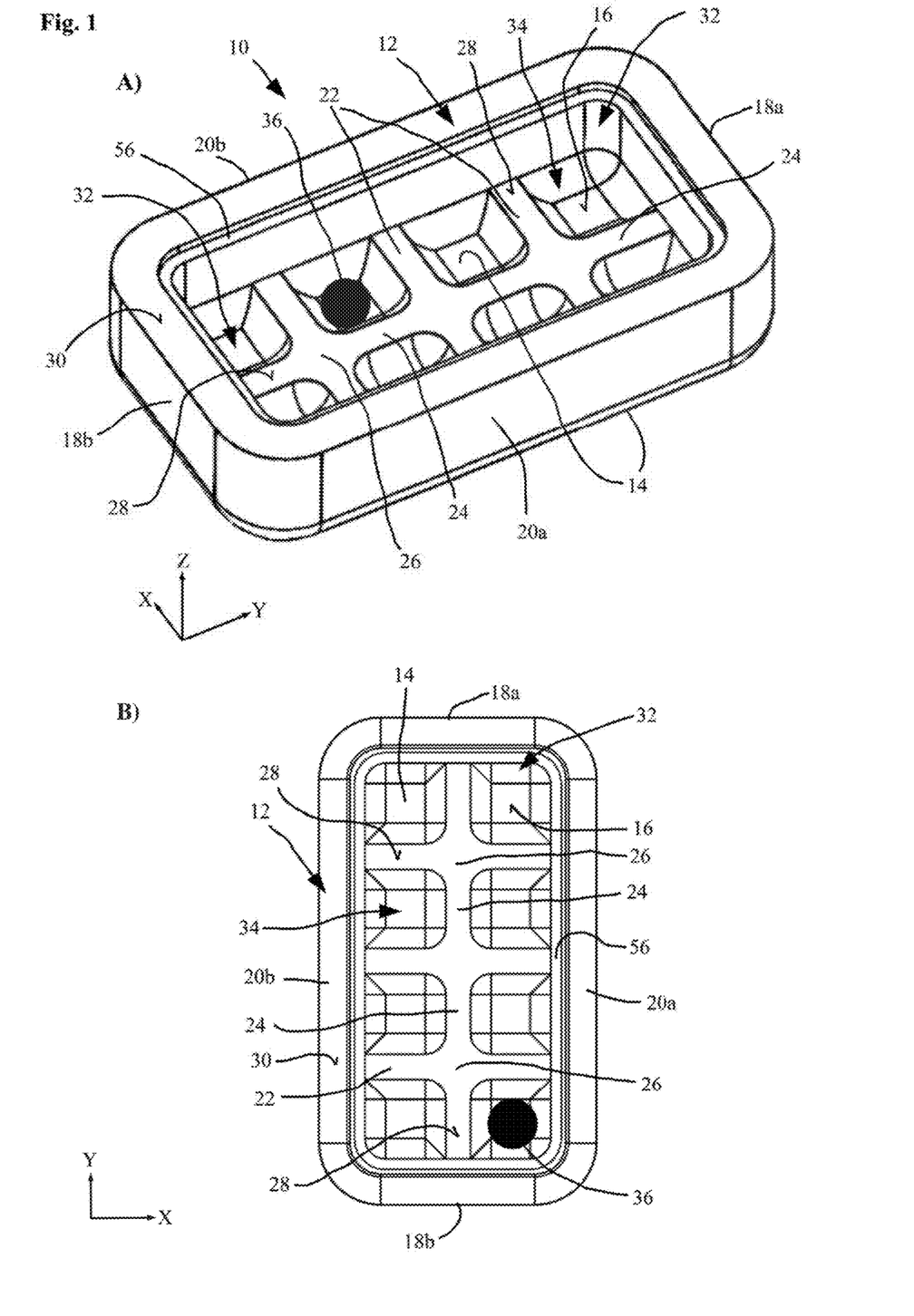
FIG. 1 shows a first specific embodiment of a receptacle component of an impulse element module in a perspective view (FIG. 1A) and in a plan view (FIG. 1B).

A first specific embodiment of an impulse element module is described with reference to FIG. 1 through 4. The following explanations regarding FIG. 1A also apply to FIG. 1B. In a perspective view, FIG. 1A shows a receptacle component 12 of an impulse element module 10 that is illustrated in FIG. 4 in the ready-for-use state thereof. Receptacle component 12 features a single-unit design and has a base 14 that may also be referred to as a bottom. Base 14 has a visible inner surface 16 and an outer surface that is not visible in FIG. 1 through 4. Side walls 18a, 18b and 20a, 20b are joined to base 14. Side walls 20a, 20b may be referred to as longitudinal walls, and side walls 18a, 18b as transverse walls. In the plan view, receptacle component 12 has an essentially rectangular shape; it being possible for the corners to have a rounded or beveled form. For FIG. 1 and all further figures, the coordinate system illustrated in FIG. 1 is used, where the X direction corresponds to the transverse direction, the Y direction to the longitudinal direction, and the Z direction (orthogonal to the X and Y directions) corresponds to a vertical direction. This coordinate system also applies analogously to all further figures.

Figure 2:
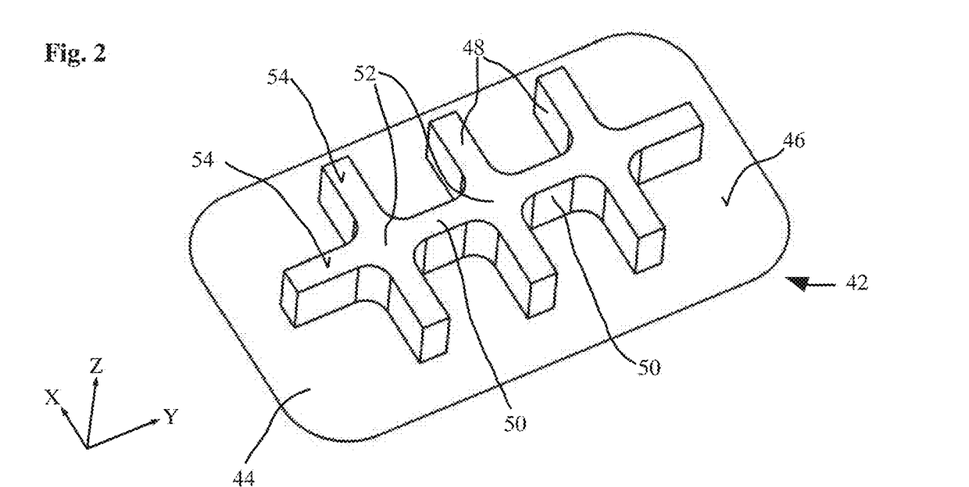
FIG. 2 shows a first specific embodiment of an insert component for the receptacle component of FIG. 1 in a perspective view.

A plurality of webs 22, 24, which project upwardly from inner surface 16, are provided on base 14. In FIG. 2, this corresponds to a direction that is orthogonal to the drawing plane. Webs 22, 24 may also be referred to as ribs. Webs 24 extend longitudinally and, accordingly, may also be referred to as longitudinal webs. Webs 22 extend transversely and, accordingly, may also be referred to as transverse webs. Longitudinal webs 24 and transverse webs 22 intersect in a plurality of intersection regions 26. FIG. 2 shows respective faces 28 of longitudinal webs 24 and transverse webs 22. Faces 28 reside at a height or a level that is lower than visible front-face rim 30 of side walls 18a, 18b, 20a, 20b. Base 14 and side walls 18a, 18b, 20a, 20b bound a receiving space 32. Longitudinal webs 24 and transverse webs 22 form a plurality of cavities 34, respectively partial volumes of cavities 34 in receiving space 32. Thus, together with base 14 and side surfaces 18a, 18b, 20a, 20b, longitudinal webs 24 and transverse webs form individual compartments, respectively subcompartments. Cavities 34 are used for accommodating a respective impulse element 36, which, in particular, may be in the form of a sphere. In FIGS. 1A and 1B, only one impulse element 36 is shown exemplarily in each instance in a cavity 34. However, the finish-machined component effectively has an impulse element, preferably in the form of a sphere, in each of the eight cavities 34 provided in this exemplary embodiment.

In a perspective view, FIG. 2 shows an insert component 42 in a single-unit form that is insertable into receptacle component 12, in particular into receiving space 32 thereof, respectively is inserted in the ready-for-use state. In the first specific embodiment, the insert component features a terminating wall 44. FIG. 2 shows inner side 46 of terminating wall 44; in the assembled state, this inner side 46 facing inner surface 16 of base 14. Insert component 42 likewise features a plurality of webs 48, 50, which are configured on terminating wall 44. Webs 48 form transverse webs, and webs 50 longitudinal webs. Longitudinal webs 50 and transverse webs 48 intersect in intersection regions 52. Longitudinal webs 50 and transverse webs 48 feature a front face 54. Upon insertion of insert component 42 into receptacle component 12 (FIG. 1), respective front faces 54 rest against faces 28. This closes cavities 34 illustrated in FIG. 1. A single cavity 34 is then bounded by base 14, webs 22, 24 and side walls 18a, 18b, 20a, 20b of the receptacle component, as well as by terminating wall 44 and webs 48, 50 of insert component 42. Terminating wall 44 thereby rests by inner side 46 thereof on a peripherally disposed inner rim 56 of receptacle component 12. In addition, terminating wall 44 has a peripheral contour whose form complements the inner periphery of receiving opening 32. In other words, inserting insert component 42 into receptacle component 12 covers or seals receiving space 32 by an interlocking fit, so that impulse elements 36 contained in cavities 34 are only able to still move within respective cavity 34 thereof.

Figure 3:
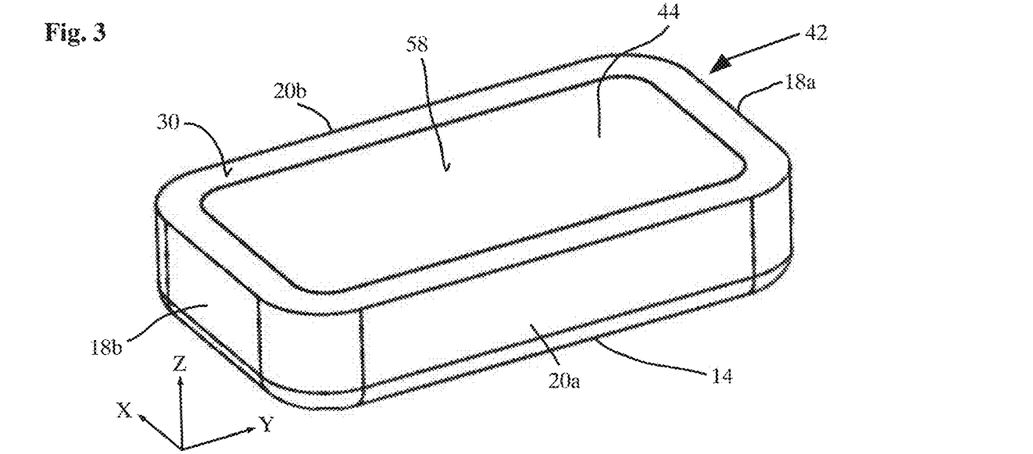
FIG. 3 shows, in a perspective view, the receptacle component of FIG. 1 including the insert component of FIG. 2 inserted.
Figure 4:
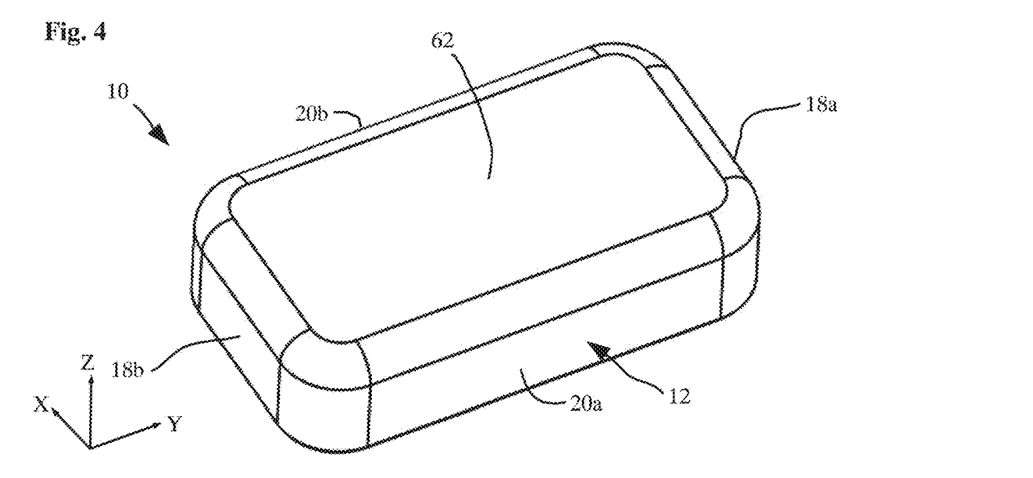
FIG. 4 shows the receptacle component closed by a sealing component.

In a perspective view, FIG. 3 shows the state when insert component 42 is inserted into receptacle component 12. It is also apparent from this illustration that an outer surface 58 of terminating wall 44 essentially ends flush with front-face rim 30 of peripheral side walls 18a, 18b, 20a, 20b. In this state, front-face rim 30 and terminating wall 44 form an essentially continuous plane or surface.

In a perspective view, FIG. 4 shows finish-machined impulse element module 10; receptacle component 12 having insert component 42 inserted (see FIG. 3), and impulse elements 36 (FIG. 1) contained in cavities 34 (FIG. 1) being sealed by a sealing component 62. Sealing component 62 may also be referred to as a cover. Sealing component 62 is at least joined in a material-to-material bond to side walls 18a, 18b, 20a, 20b of receptacle component 12. It may also be additionally joined, however, in a material-to-material bond to terminating wall 44 (FIG. 3) of insert component 42.

An additive manufacturing process, in particular a selective laser melting process, is preferably used to produce the first specific embodiment of an impulse element module 10 presented in FIG. 1 through 4 having the respective single-unit components: receptacle component 12, insert component 42 and sealing component 62. Beginning with a first layer of base 14, receptacle component 12 is thereby built up layer by layer in vertical or Z direction (FIG. 1). Starting from a first layer of terminating wall 44, insert 42 is built up layer by layer in vertical or Z direction (FIG. 2). Upon insertion of single-unit insert component 42 into receiving opening 32 of receptacle component 12, impulse elements 36 are inserted into respective cavities 34. Starting from a state in accordance with FIG. 3, sealing component 62 is manufactured layer by layer on the not yet completely finish-machined impulse element module 10 using the additive process, in particular the selective laser melting process. A first powder layer is thereby applied to the continuous surface or plane (FIG. 3) formed by front-face rim 30 and outer side 58 of terminating wall 44 and then joined in a material-to-material bond. Thus, impulse element module 10, produced in this manner, features a structure that is simple to manufacture and that is closed in a stress-free manner. In particular, no unwanted stresses occur either, as can arise when working with conventional covers, for instance covers which employ a form-locking connection (snap-fit connection or the like). Since the same material and the same manufacturing method are used for all three components: namely receptacle component 12, insert component 42 and sealing component 62, a homogeneously constructed impulse element module is attained where the individual components have the same material properties.

This type of manufacturing of impulse element module 10 according to the present invention makes it possible to ensure that impulse elements 36 are enclosed airtight in associated cavities 34 and that no gas from the outside is able to seep in to reach them. This is of particular importance when impulse element module 10 is to be used in the hot gas zone of the turbomachine, thus, for example, on a blade assembly in the turbine section of the turbomachine. Sealing impulse elements 36 airtight in cavities 34 protects them from wear caused by hot gas oxidation and/or sulfidation.

Furthermore, the previously described manufacturing method makes possible a low-cost mass production. Impulse element modules 10 are relatively small. Thus, in practice, depending on the field of application, the dimension of the longest side thereof, thus of the longitudinal or Y direction side, is, at most, a few centimeters, preferably less than two centimeters, and more preferably between one and 1.5 centimeters. Thus, generally, the installation space of a conventional SLM machine allows the concurrent manufacturing of several hundred receptacle components 12 and several hundred inserts 42.

Preferred materials for manufacturing receptacle components 12, insert components 42, and sealing component 62 may be: Haynes 230, Inco 718, Hastelloy X, MARM 247, MARM 247 LLDS, MARM 509. Besides these preferred materials, other materials suited for additive manufacturing methods may also be used.

Figure 5:
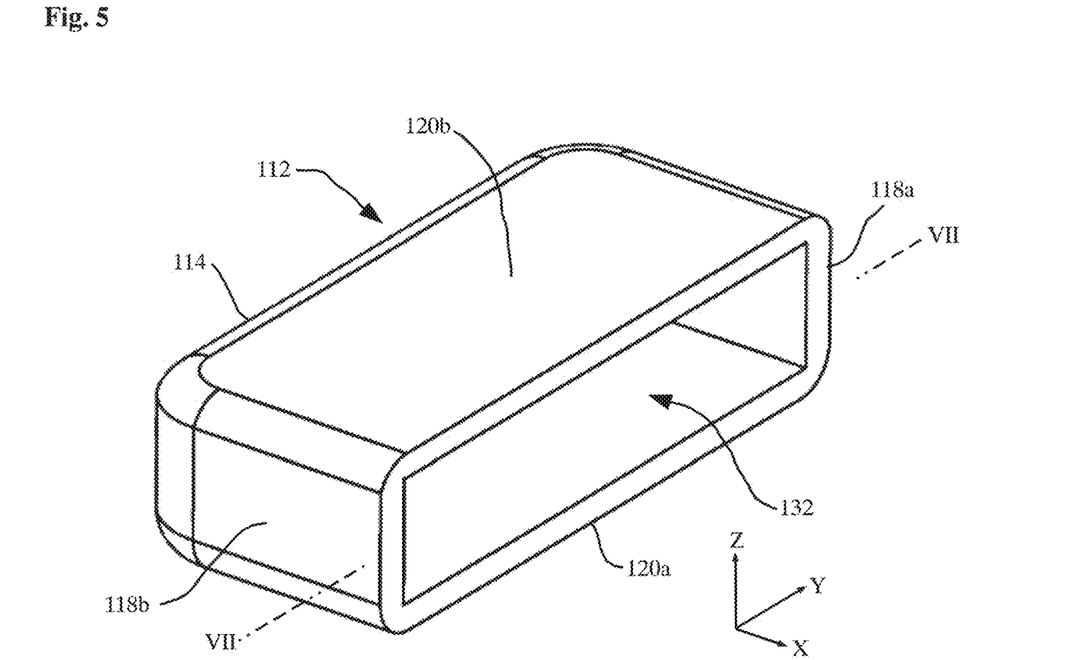
FIG. 5 shows a second specific embodiment of a receptacle component of an impulse element module in a perspective view.

A second specific embodiment of an impulse element module 110 is described with reference to FIG. 5 through 8. FIG. 5 is a perspective view of receptacle component 112. This receptacle component 112, as well, includes a base 114 and side walls 118a, 118b, 120a, 120b that are joined to base 114. Base 114 and side walls 118a, 118b, 120a, 120b bound receiving space 132. On inner side thereof, which is not visible in FIG. 5 and faces receiving space 132, base 114 is essentially plane or flat. Thus, in contrast to the specific embodiment of FIG. 1 through 4, it does not have any webs or ribs.

Figure 6:
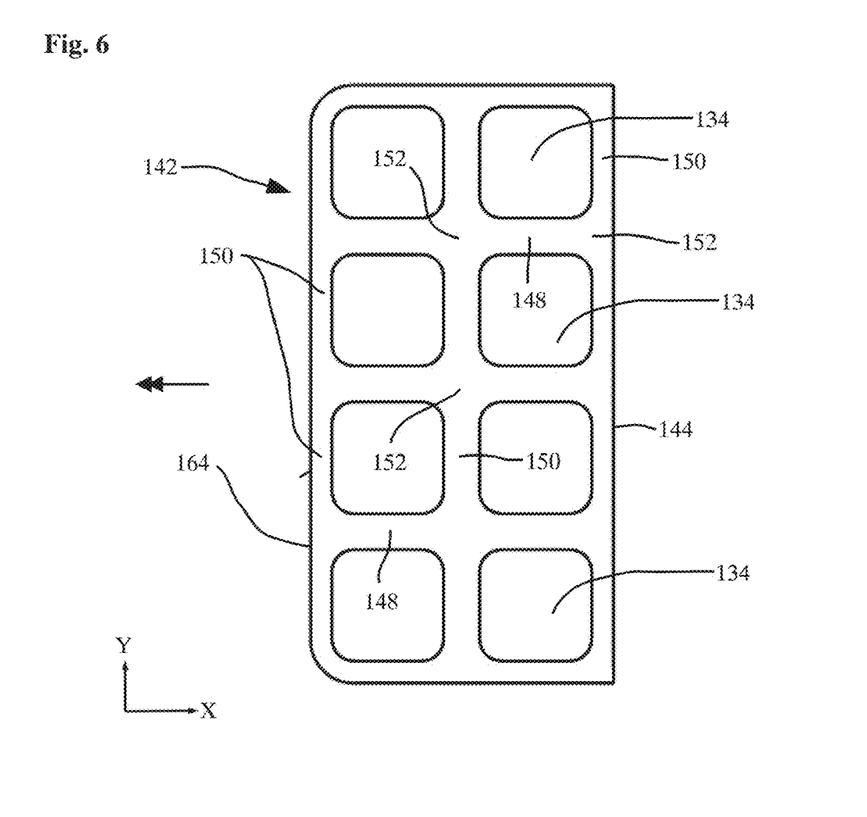
FIG. 6 shows a second specific embodiment of an insert component for the receptacle component of FIG. 1 in a plan view.

In a plan view, FIG. 6 shows an insert component 142 that may be inserted or introduced into receiving space 132 of receptacle component 112 (FIG. 5) (in the double arrow direction). Insert component 142 includes a plurality of webs 148, 150. Webs 148 may thereby be referred to as transverse webs, and webs 150 as longitudinal webs. Longitudinal webs 150 and transverse webs 148 intersect in intersection regions 152. Webs 148, 150 bound respective chambers or cavities 134. In other words, it may be said that insert component 142 has a grid-like design or is a grid having a plurality of chambers or cavities 134. Longitudinal webs 150, which, in FIG. 6, are interconnected on the left side, form a continuous supporting surface 164, which, in the state of insert component 142 being inserted in receptacle component 112, rest on the inner surface of base 114. Longitudinal webs 150, which, in FIG. 6, are interconnected on the right side, form a continuous terminating wall 144.

Figure 7:
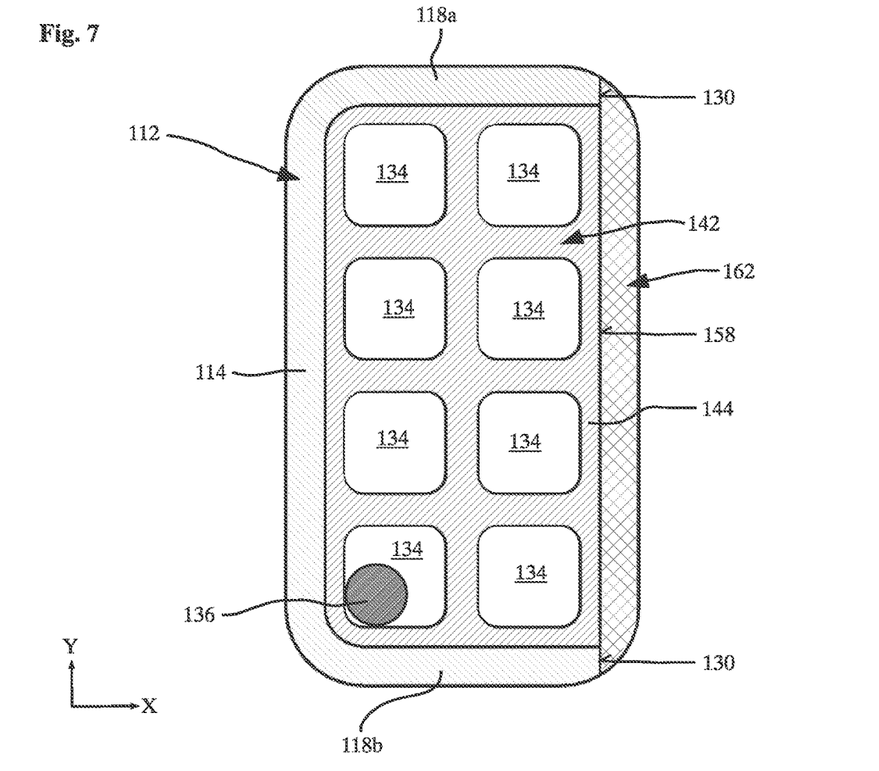
FIG. 7 shows a sectional view of the impulse element module of the second specific embodiment including the sealing component mounted thereon.

In a cross-sectional view corresponding approximately to a line of intersection VII-VII of FIG. 5, FIG. 7 shows the assembled state of impulse element module 110. Receptacle component 112 has insert component 142 inserted therein. Upon insertion of insert component 142, cavities 134 are bounded by the respective inner sides of side walls 120a and 120b, so that each cavity 134 is closed separately. An impulse element 136, preferably in the form of a sphere, is inserted in each cavity, only one sphere 136 in cavity 134 being shown exemplarily at the lower left of FIG. 7. From this illustration, it is also apparent that an outer surface 158 of terminating wall 144 essentially ends flush with front-face rim 130 of peripheral side walls 118a, 118b (visible in the cross-sectional view) and 120a, 120b (not visible in the cross-sectional view). In this state, front-face rim 130 and terminating wall 144 form an essentially continuous plane or surface.

Figure 8:
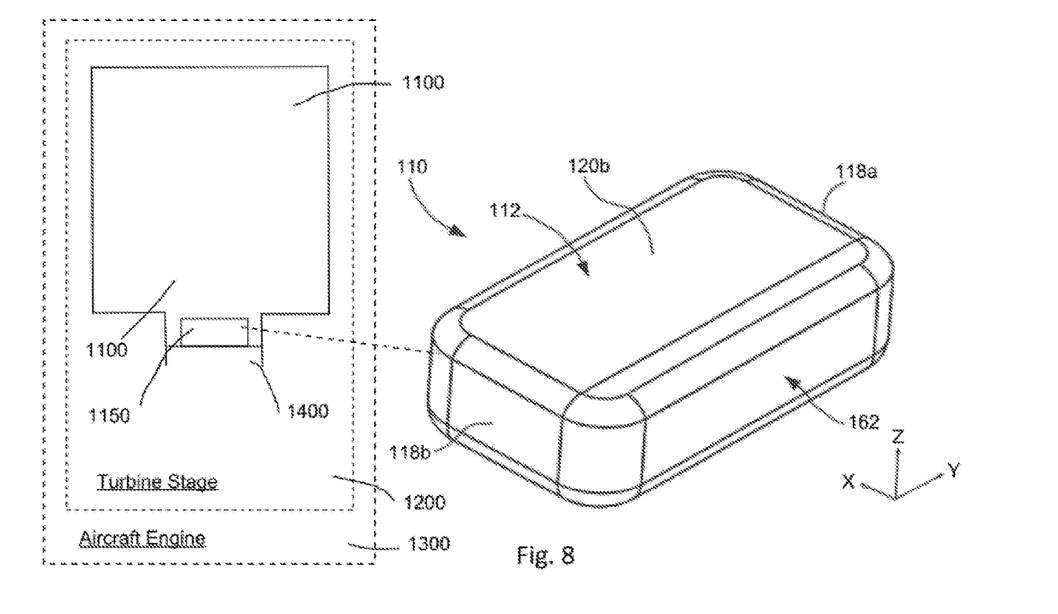
FIG. 8 shows the impulse element module of the second specific embodiment in a perspective, external view.

It is readily apparent from FIGS. 7 and 8 that receptacle component 112 is sealed by a terminating sealing component 162. Sealing component 162 may also be referred to as a cover. Sealing component 162 is at least joined in a material-to-material bond to side walls 118a, 118b, 120a (not visible), 120b of receptacle component 12. It may also be additionally joined, however, in a material-to-material bond to terminating wall 144 of insert component 142.

An additive manufacturing process, in particular a selective laser melting process, is preferably used to produce the second specific embodiment of an impulse element module 110 presented in FIG. 5 through 8 having the respective single-unit components: receptacle component 112, insert component 142 and sealing component 162. Beginning with a first layer of base 114, receptacle component 112 is thereby built up layer by layer in transverse or X direction (FIG. 5, FIG. 7). Starting from a first layer, insert 142 is built up layer by layer in vertical or Z direction (FIG. 5, FIG. 6). Upon insertion of single-unit insert component 142 into receiving opening 132 of receptacle component 112, impulse elements 136 are inserted into respective cavities 134. Starting from a state in which insert component 142 is inserted into receptacle component 112, sealing component 162 is manufactured layer by layer on the not yet completely finish-machined impulse element module 110 using the additive process, in particular the selective laser melting process. A first powder layer is thereby applied to the continuous surface or plane (FIG. 7) formed by front-face rim 130 and outer side 158 of terminating wall 144 and then joined in a material-to-material bond. Thus, impulse element module 110, produced in this manner, features a structure that is simple to manufacture and that is closed in a stress-free manner. In particular, no unwanted stresses occur either, as can arise when working with conventional covers, for instance covers that employ a form-locking connection (snap-fit connection or the like). Since the same material and the same manufacturing method are used for all three components: namely receptacle component 112, insert component 142 and sealing component 162, a homogeneously constructed impulse element module is attained, where the individual components have the same (material) properties.

Figure 9:
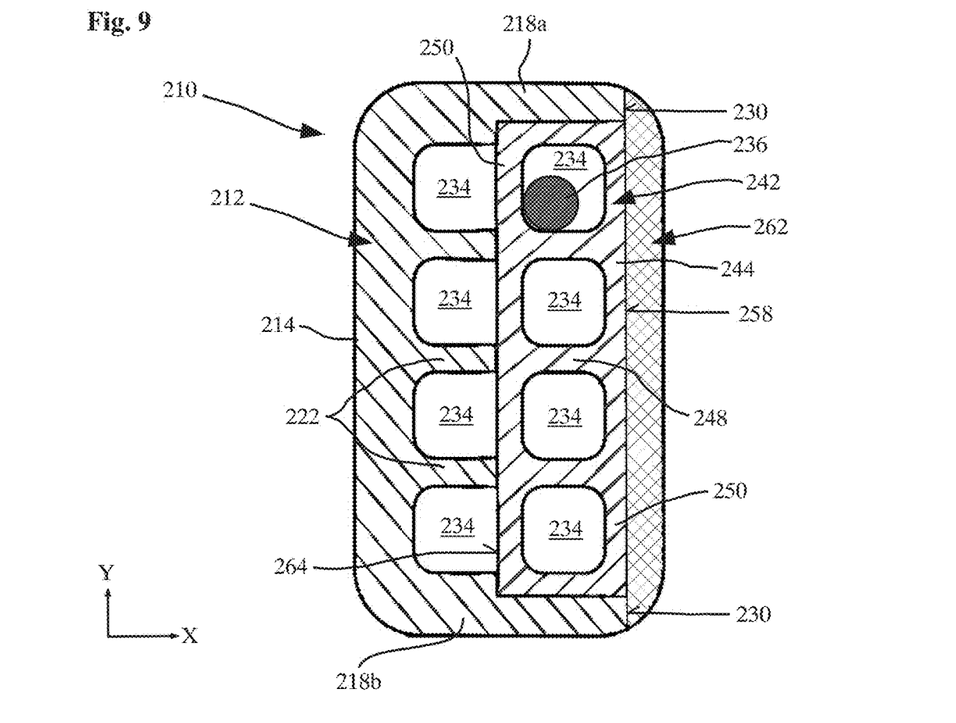
FIG. 9 shows a third specific embodiment of an impulse element module in a sectional view similar to FIG. 7.

In a sectional view similar to FIG. 7, FIG. 9 shows a third specific embodiment of an impulse element module 210. Here, transverse webs 248 are formed on base 214, so that partial volumes of cavities 234 are bounded by base 214 and these transverse webs 248. Insert component 242 features known longitudinal webs 250 and transverse webs 248. Longitudinal webs 250 located on the left side in FIG. 9 form a continuous supporting surface 264 supported on transverse webs 248 of receptacle component 212. Insert component 242 may also be described as corresponding more or less to a halved insert component 142 of the second specific embodiment (FIG. 6, right half). Longitudinal webs 250 illustrated on the right side in FIG. 9 form a continuous terminating wall 244. The four cavities 234 on the left in FIG. 9 are each bounded by base 214 and transverse webs 222 of receptacle component 212, as well as by continuous supporting surface 264 of insert component 242. The right four cavities 234 are part of insert component 242 and are bounded by transverse webs 248 and longitudinal webs 250 thereof.

It is also readily apparent from this illustration that an outer surface 258 of terminating wall 244 essentially ends flush with front-face rim 230 of peripheral side walls 218a, 218b (visible in the cross-sectional view). In this state, front-face rim 230 and terminating wall 244 form an essentially continuous plane or surface.

From FIG. 9, it is readily apparent that receptacle component 212 is sealed by a terminating sealing component 262. Sealing component 262 may also be referred to as a cover. Sealing component 262 is at least joined in a material-to-material bond to side walls 218a, 218b (and to the further side walls (not shown), analogously to the previous specific embodiments) of receptacle component 212. It may also be additionally joined, however, in a material-to-material bond to terminating wall 244 of insert component 242.

Figure 10:
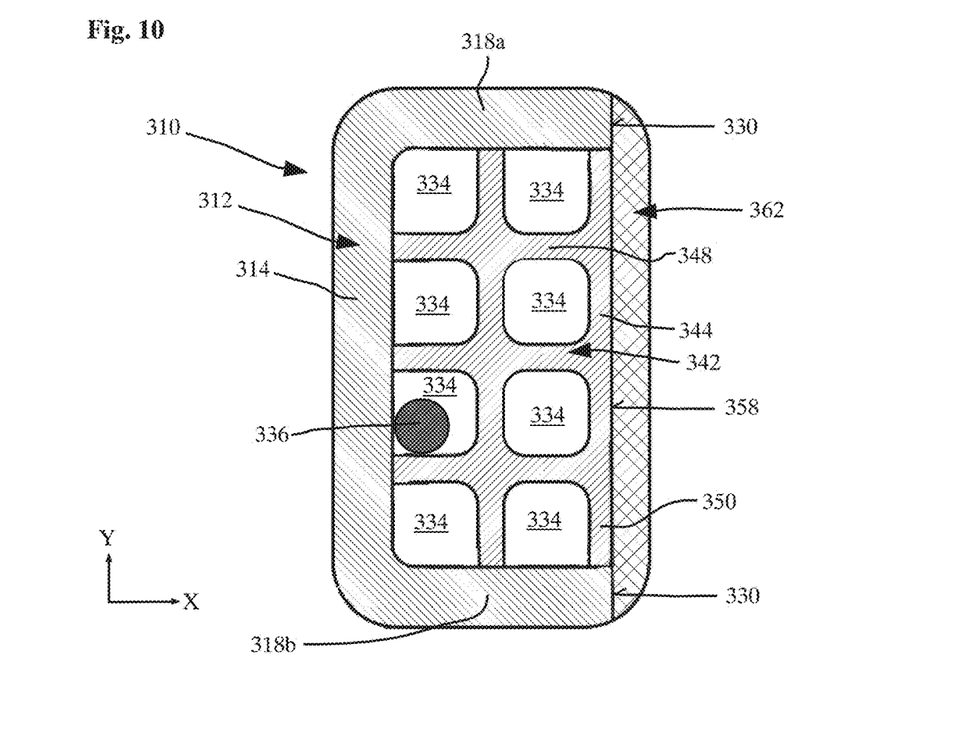
FIG. 10 shows a fourth specific embodiment of an impulse element module in a sectional view similar to FIG. 7 or 9.

In a sectional view similar to FIG. 9, FIG. 10 shows a fourth specific embodiment of an impulse element module 310. Here, no transverse or longitudinal webs are formed on base 314. Insert component 342 features known longitudinal webs 350 and transverse webs 348. The left three transverse webs are supported by the unattached ends, respectively end faces thereof on base 314 of receptacle component 312. Longitudinal webs 350 illustrated on the right side in FIG. 10 form a continuous terminating wall 344. The four cavities 334 on the left in FIG. 10 are bounded respectively by base 314 and partially by side walls 318a, 318b of receptacle component 212, as well as by transverse webs 348 and longitudinal webs 350 of insert component 342. The right four cavities 334 are bounded by transverse webs 348 and longitudinal webs 350 of insert component 342 and partially by side walls 318a, 318b of receptacle component 312.

It is also readily apparent from this illustration that an outer surface 358 of terminating wall 344 essentially ends flush with front-face rim 330 of peripheral side walls 318a, 318b (visible in the cross-sectional view). In this state, front-face rim 330 and terminating wall 344 form an essentially continuous plane or surface.

From FIG. 10, it is readily apparent that receptacle component 312 is sealed by a terminating sealing component 362. Sealing component 362 may also be referred to as a cover. Sealing component 362 is at least joined in a material-to-material bond to side walls 318a, 318b (and to the further side walls (not shown), analogously to the previous specific embodiments) of receptacle component 312. It may also be additionally joined, however, in a material-to-material bond to terminating wall 344 of insert component 342.

With regard to manufacturing using an additive process, the second specific embodiment, described with reference to FIG. 5 through 8, likewise applies to the third and fourth specific embodiments. In this regard, reference is also made to the corresponding description above; in the context of FIGS. 9 and 10, it being conceivable to simply replace the reference numerals having a leading "1" with those having a leading "2" or "3."

Impulse element modules 10, 110, 210, 310 presented here may be used as vibration dampers in components of a turbomachine, in particular in rotor blade assemblies of a gas turbine. For this purpose, a rotor blade assembly may have a depression into which an impulse element module 10, 110, 210, 310 may be introduced and secured. The depression may thereby be formed, in particular, to essentially complement an outer contour of impulse element module 10, 110, 210, 310. This makes it possible to also achieve a type of interlocking connection between impulse element module 10, 110, 210, 310 and the component of the turbomachine, in particular of the rotor blade assembly. A rotor blade assembly is thereby understood to be a single rotor blade or a combined group of rotor blades. An impulse element module 10, 110, 210, 310 may thereby be provided, in particular, in a depression 1150 of a root region 1000 of a rotor blade assembly 1100 of a turbine or compressor stage 1200 of an aircraft turbine gas engine 1300 with a plurality of compressor and turbine stages, as shown schematically in FIG. 8, preferably a single impulse element being associated with a single rotor blade assembly 1100 associated with a rotor blade ring also shown schematically as 1400. The impulse element modules presented here, produced as single-unit components, may be readily manufactured and easily handled when attached to a rotor blade assembly. It is also very simple to replace such impulse element modules, for instance in the course of maintenance operations. Altogether, an impulse element module for damping impact vibrations in a gas turbine is attained that is readily manufactured and easily manipulated.

LIST OF REFERENCE NUMERALS 10, 110, 210, 310 impulse element module
12, 112, 212, 312 receptacle component
14, 114, 214, 314 base
16 inner surface
18a, 118a, 218a, 318a side wall
18b, 118b; 218b; 318b side wall
20a, 120a side wall
20b, 120b side wall
22, 222 transverse web
24 longitudinal web
26 intersection region
28 face
30, 130, 230, 330 front-face rim
32, 132, 232, 332 receiving space
34, 134, 234, 334 cavity
36, 136, 236, 336 impulse element
42, 142, 242, 342 insert component
44, 144, 244, 344 terminating wall
46, 146, 246, 326 inner side
48, 148, 248, 348 transverse web
50, 150, 250, 350 longitudinal web
52, 152 intersection region
54 front face
56 inner rim
58, 158, 258, 358 outer surface
62, 162, 262, 362 sealing component
1000 root region
1100 turbine blade assembly
1150 depression
1200 turbine or compressor stage
1300 aircraft turbine jet engine
1400 rotor blade ring

What is claimed is:

1. An impulse element module installed in an installation space of a rotor blade assembly of a turbomachine, the impulse element module comprising a single-unit receptacle component having a base and side walls extending peripherally thereon, the side walls and the base bounding a receiving space;
a single-unit insert component inserted into a receiving space of the receptacle component; together, the receptacle component and the insert component accommodated therein being designed to define a plurality of spaced apart cavities; and an impulse element being accommodated in each cavity; and
a single-unit seal component joined in a material-to-material bond to the receptacle component to allow the receiving space to be sealed, and the insert component to be surrounded by the receptacle component and the seal component.

2. The impulse element module as recited in claim 1 wherein the insert component has a terminating wall, the terminal wall, in the inserted state of the insert component in the receptacle component, sealing the receiving space.

3. The impulse element module as recited in claim 2 wherein the terminating wall, via an outer side facing away from the receiving space, ending flush with at least one front face of the side walls of the receptacle component, the side walls being surrounding side walls.

4. The impulse element module as recited in claim 2 wherein the terminating wall, at an inner side facing the receiving space, has a plurality of webs projecting from the inner side.

5. The impulse element module as recited in claim 4 wherein the webs include longitudinal and transverse webs.

6. The impulse element module as recited in claim 1 wherein the base and the side walls of the receptacle component have a flat form on inner surfaces thereof facing the receiving space.

7. The impulse element module as recited in claim 6 wherein the insert component has a plurality of longitudinal webs and transverse webs forming a grid-like structure; the longitudinal webs and the transverse webs, together with at least one of inner surfaces of the base or of the side walls, bounding the plurality of cavities, at least in portions thereof.

8. The impulse element module as recited in claim 1 wherein on an inner surface facing the receiving space, the base has a plurality of webs projecting into the receiving space to allow the webs and the inner surface of the base to form a partial volume of the plurality of cavities.

9. The impulse element module as recited in claim 8 wherein the webs include longitudinal and transverse webs.

10. The impulse element module as recited in claim 2 wherein the insert component has a plurality of webs and the receptacle component has a plurality of other webs; wherein the insert component and the receptacle component are configured in a way that allows front faces of the plurality of webs of the insert component and other front faces of the other plurality of webs of the receptacle component to rest against each other in the inserted state of the insert component, in a way that allows the plurality of cavities to be bounded by the webs of the insert component, the other webs of the receptacle component, an inner surface of the base and by an inner side of the terminating wall.

11. The impulse element module as recited in claim 2 wherein the seal component is joined in a material-to-material bond to the terminating wall of the insert component.

12. The impulse element module as recited in claim 1 wherein the receptacle component, the insert component, and the seal component are additively manufactured.

13. The impulse element module as recited in claim 1 wherein the receptacle component, the insert component, and the seal component are additively manufactured by a selective laser melting process.

14. The impulse element module as recited in claim 1 wherein the receptacle component or the insert component or the seal component is at least partially manufactured in a machining process or in a powder metal injection molding process.

15. The impulse element module as recited in claim 14 wherein the receptacle component or the insert component or the seal component is at least partially manufactured in a machining process, the machining process being electrochemical machining.

16. The impulse element as recited in claim 1 wherein the impulse element is a sphere.

17. A method for manufacturing an impulse element module for a turbomachine, the method comprising the steps of:
   manufacturing a receptacle component by building up the receptacle component layer by layer using an additive manufacturing process, the receptacle component having a base and side walls extending peripherally thereon; the side walls being built up starting from the base to allow a receiving space to be formed within the side walls;
   manufacturing an insert component grid-like at least in portions by building up the insert component layer by layer using the additive manufacturing process;
   inserting the insert component into the receiving space of the receptacle component; prior to or during the insertion, impulse elements being inserted into cavities jointly formed by the receptacle component and the insert component;
   using the additive manufacturing process to build up a seal component layer by layer on the receptacle component having the insert component inserted therein, to mutually join the receptacle component and the seal component in a material-to-material bond and form a single-unit enclosure for the insert component and the impulse elements contained therein.

18. The method as recited in claim 17 wherein the additive manufacturing process is a selective laser melting process.

19. The method as recited in claim 18 wherein the impulse elements are spheres.

20. A rotor blade assembly of a compressor stage or of a turbine stage of a gas turbine, comprising:
   a depression, the impulse element module as recited in claim 1 being inserted in the depression, the depression defining at least a part of the installation space.

21. The rotor blade assembly as recited in claim 20 wherein the depression is in a rotor blade root region.

22. A gas turbine comprising the impulse element module as recited in claim 1 associated with a compressor stage or a turbine stage.

23. The gas turbine as recited in claim 22 wherein a plurality of impulse element modules are associated with a rotor component.

24. The gas turbine as recited in claim 23 wherein the rotor component is in a rotor blade ring, a compressor stage or a turbine stage.

25. The gas turbine as recited in claim 22 wherein a single impulse element module is associated with a single rotor blade assembly of the rotor blade ring.

26. An aircraft gas turbine comprising the gas turbine of claim 22.

* * * * *